(12) United States Patent
Vermeulen

(10) Patent No.: US 9,523,820 B1
(45) Date of Patent: Dec. 20, 2016

(54) ADIABATIC POLARIZATION ROTATION AND SPLITTING

(71) Applicant: Acacia Communications, Inc., Maynard, MA (US)

(72) Inventor: Diedrik Vermeulen, New York, NY (US)

(73) Assignee: Acacia Communications, Inc., Maynard, MA (US)

( * ) Notice: Subject to any disclaimer, the term of this patent is extended or adjusted under 35 U.S.C. 154(b) by 0 days.

(21) Appl. No.: 14/797,005

(22) Filed: Jul. 10, 2015

Related U.S. Application Data

(60) Provisional application No. 62/023,498, filed on Jul. 11, 2014.

(51) Int. Cl.
| | |
|---|---|
| G02B 6/00 | (2006.01) |
| G02B 6/10 | (2006.01) |
| G02B 6/27 | (2006.01) |
| G02B 6/126 | (2006.01) |
| G02B 6/12 | (2006.01) |

(52) U.S. Cl.
CPC ............ *G02B 6/2733* (2013.01); *G02B 6/126* (2013.01); *G02B 6/2773* (2013.01); *G02B 2006/12097* (2013.01)

(58) Field of Classification Search
CPC ...... G02B 6/2733; G02B 6/126; G02B 6/2773
USPC .................................................. 385/11, 132
See application file for complete search history.

(56) References Cited

U.S. PATENT DOCUMENTS

| | | | | |
|---|---|---|---|---|
| 2008/0025665 | A1* | 1/2008 | Little | G02B 6/126 385/30 |
| 2015/0063767 | A1* | 3/2015 | Jauregui Misas | H01S 3/06737 385/122 |

OTHER PUBLICATIONS

Chen et al., Compact polarization rotator on silicon for polarization-diversified circuits. Opt Lett. Feb. 2011;36(4):469-71. doi: 10.1364/OL.36.000469.

Dai et al., Novel concept for ultracompact polarization splitter-rotator based on silicon nanowires. Opt Express. May 23, 2011;19(11):10940-9. doi: 10.1364/OE.19.010940.

Ding et al., Towards polarization diversity on the SOI platform with simple fabrication process. IEEE Photon Tech Lett. Sep. 26, 2011;23(23):1808-10. doi: 10.1109/LPT.2011.2169776.

Holmes et al., Realization of novel low-loss monolithically integrated passive waveguide mode converters. IEEE Photon Tech Lett. Jan. 1, 2006;18(1):43-5. doi: 10.1109/LPT.2005.859987.

Kotlyar et al., Compact polarization converter in InP-based material. Opt Express. Jun. 27, 2005;13(13):5040-5.

Liu et al., Silicon-on-insulator polarization splitting and rotating device for polarization diversity circuits. Opt Express. Jun. 20, 2011;19(13):12646-51. doi: 10.1364/OE.19.012646.

(Continued)

*Primary Examiner* — Jerry Blevins
(74) *Attorney, Agent, or Firm* — Wolf, Greenfield & Sacks, P.C.

(57) ABSTRACT

A photonic device comprising a first waveguide core and a second waveguide core. The first waveguide core is asymmetric relative to an imaginary plane that bisects a height of the first waveguide core and is parallel to the bottom surface of the first waveguide core throughout a first region of the photonic device. A side surface of the second waveguide core is parallel to the first waveguide core throughout the first region of the photonic device.

20 Claims, 6 Drawing Sheets

(56) References Cited

OTHER PUBLICATIONS

Rahman et al., Design and characterization of compact single-section passive polarization rotator. J Lightwave Tech. Apr. 2001;19(4):512-9.

Vermeulen et al., High Efficiency Broadband Polarization Rotator on Silicon-On-Insulator. 2010 $7^{th}$ IEEE International Conference on Group IV Photonics, Beijin. Sep. 1-3, 2010;42-4. doi: 10.1109/GROUP4.2010.5643432.

Zhang et al., Silicon-Waveguide-Based Mode Evolution Polarization Rotator. IEEE J Sel Topics Quantum Electron. Jan.-Feb. 2010;16(1):53-60. doi: 10.1109/JSTQE.2009.2031424.

* cited by examiner

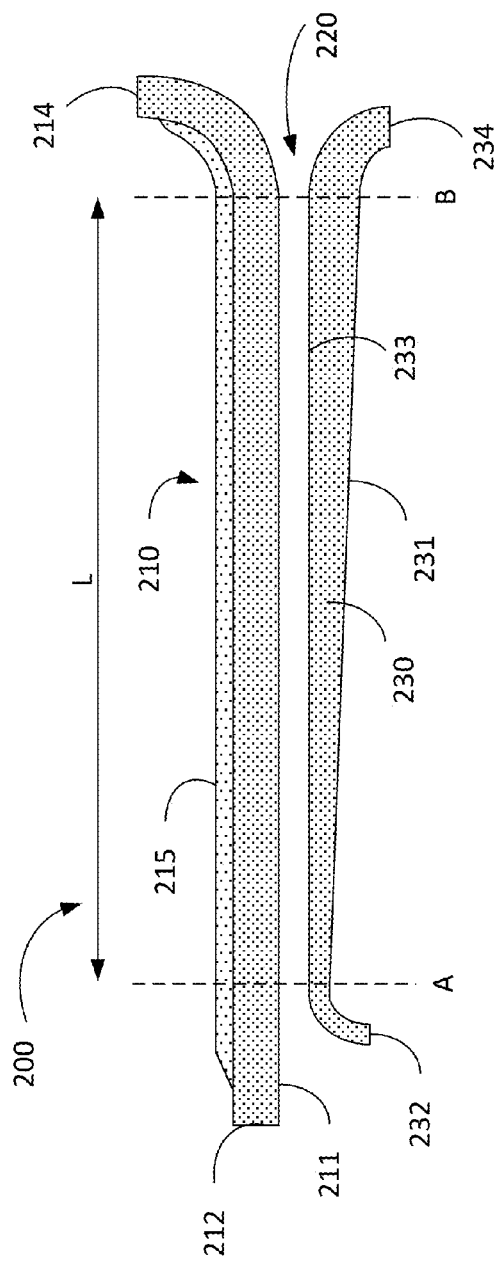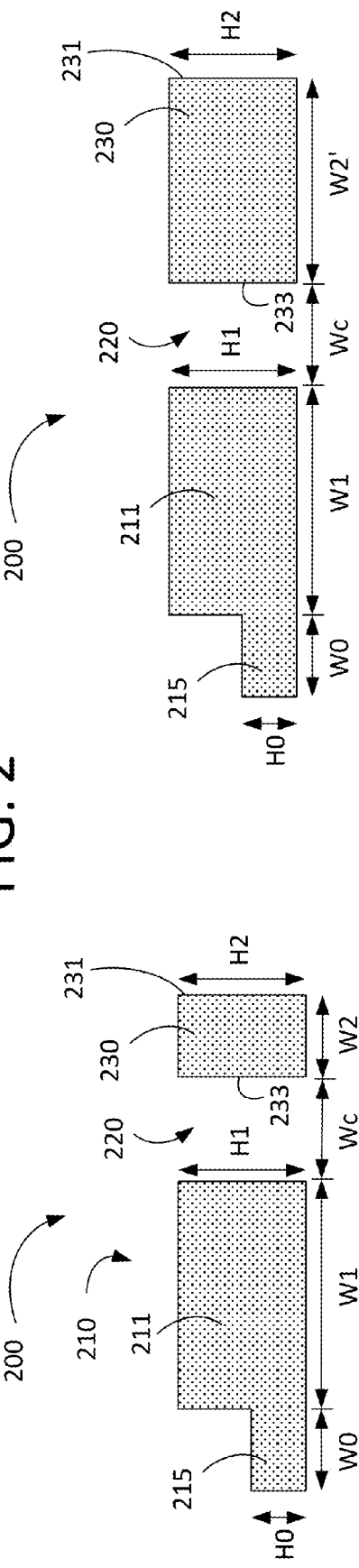
FIG. 2
FIG. 3A
FIG. 3B

US 9,523,820 B1

ADIABATIC POLARIZATION ROTATION AND SPLITTING

RELATED APPLICATIONS

The present application claims the benefit under 35 U.S.C. §119(e) of U.S. Provisional Patent Application Ser. No. 62/023,498 entitled "ADIABATIC POLARIZATION ROTATOR USING A SYMMETRY BREAKING FIN," filed Jul. 11, 2014, which is incorporated herein by reference in its entirety.

BACKGROUND

Field

The present application relates to adiabatically splitting and/or rotating the polarization of light.

Related Art

Waveguides are used in many applications to efficiently confine and guide electromagnetic radiation. Some waveguides are created using the principle of total internal reflection within a dielectric, or an approximation thereof. For example, in the field of integrated photonics, a first dielectric material of a first index of refraction is used to form a waveguide path and a dielectric of a second dielectric material, with a second index of refraction with a smaller value than the first index of refraction, is formed around the waveguide path. Using a dielectric material with a larger index as the waveguide path results in total internal reflection of the electromagnetic radiation.

When silicon waveguides with a small core (e.g., less than 1 micron) are formed on silicon-on-insulator (SOI) substrates, the waveguide tends to become birefringent. Thus, to ensure a photonic circuit is polarization independent, a polarization diversity scheme is conventionally used. Such schemes use polarization splitters and rotators to manipulate the polarization of the light within the photonic circuit. Also, many optical transmission formats utilize both polarizations, which generally requires transmitters and receivers capable of splitting and rotating polarization.

Conventional polarization rotators for use in a waveguide are based on the principles of operation of half-wave plates that are conventionally used in free-space optics. In free-space, half-wave plates formed from a birefringent material are introduced into the light path with an optical axis oriented at an angle with respect to the polarization of the light. Accordingly, the component of the light's polarization that is parallel to the optic axis experiences a first phase shift as it traverses the half-wave plate and the component of the light's polarization that is orthogonal to the optic axis experiences a second phase shift, different from the first phase shift, as it traverses the half-wave plate. The different phase shift between the two polarizations causes a rotation of the polarization of the light. Conventional polarization rotators for use in waveguides operate in the same way by introducing a birefringent waveguide into the path of the light.

BRIEF SUMMARY

Aspects of the present application provide a novel technique for splitting and/or rotating the polarization of light in a waveguide.

Throughout the present application, when polarization modes of a waveguide are discussed, the term "transverse electric (TE) mode" refers to a TE mode and/or a quasi-TE mode, and the term "transverse magnetic (TM) mode" refers to a TM mode and/or a quasi-TM mode.

Some embodiments are directed to a photonic device that includes a first waveguide core and a second waveguide core. The first waveguide core is asymmetric relative to an imaginary plane that bisects a height of the first waveguide core and is parallel to the bottom surface of the first waveguide core throughout a first region of the photonic device. A side surface of the second waveguide core is parallel to the first waveguide core throughout the first region of the photonic device.

Other embodiments are directed to a method of separating the transverse electric (TE) and transverse magnetic (TM) modes of light. The method includes introducing light into a first waveguide core, a first portion of the light in a TE mode and a second portion of the light in a TM mode of the first waveguide core, wherein the first waveguide core is asymmetric relative to a plane that bisects an imaginary plane that bisects the height of the first waveguide core and is parallel to a bottom surface of the first waveguide core throughout a first region. The method also includes evanescently coupling, in the first region, the second portion of the light in the TM mode to a second waveguide core, wherein a side surface of the second waveguide core is parallel to the first waveguide core throughout the first region of the photonic device.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

FIG. 2 is a top elevation view of a photonic device according to some embodiments;

FIG. 3A is a cross-section of the photonic device illustrated in FIG. 2, the cross-section being through plane "A" illustrated in FIG. 2;

FIG. 3B is a cross-section of the photonic device illustrated in FIG. 2, the cross-section being through plane "B" illustrated in FIG. 2;

DETAILED DESCRIPTION

The inventors have recognized and appreciated that polarization rotation based on principles of a half-wave plate, which require a precise phase shift between two modes, are not robust to fabrication variations. Polarization rotators that rely on birefringence must be a precise length because the polarization of the light will continue to rotate (referred to as "mode beating," as the light changes from a TE mode to a TM mode and back again) as long as it is propagating through a birefringent material. Thus, the length of the polarization rotator must be equal to half of a mode-beating length to result in high efficiency polarization rotation. Moreover, polarization rotators based on birefringence are wavelength dependent. Thus, polarization rotators based on birefringence do not conventionally have a broad bandwidth of operational wavelengths. Furthermore, polarization rotators based on birefringence can be difficult to fabricate and integrate into conventional photonics process flows because they require waveguide birefringence axes that are at an angle to the vertical and horizontal axes of the waveguide.

Figure 1A:
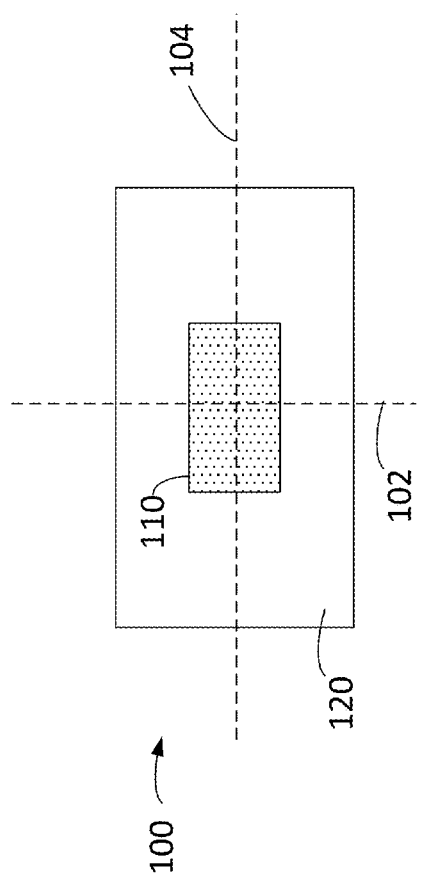
FIG. 1A is a cross-section of a conventional waveguide.

Most conventional waveguides are laterally symmetric. The inventors have recognized and appreciated that breaking the lateral symmetry of a waveguide can cause one polarization to convert into another polarization. FIG. 1 illustrates a cross-section of a conventional waveguide 100. The waveguide includes a core 110 and a cladding 120. The core 110 has a rectangular cross-section made from a guiding material that has an index of refraction that is larger than the index of refraction of the cladding 120. For example, the core 110 may be formed from silicon and the cladding 120 may be formed from silicon oxide. Using a dielectric material with a larger index as the waveguide core 110 results in total internal reflection of light, which results in light being confined and guided down the waveguide. Cross-sections of conventional rectangular waveguides are symmetric about both a vertical line of symmetry 102 that passes through the center of the core 110 (known as vertical symmetry) and a horizontal line of symmetry 104 that also passes through the center of the core 110 (known as horizontal symmetry).

Figure 1B:
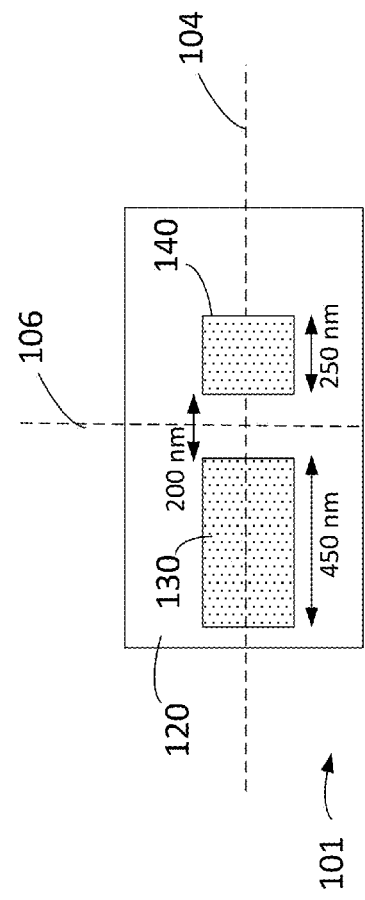
FIG. 1B is a cross-section of a conventional directional splitter.

A directional coupler is a four-port photonic devices that acts similar to a free-space beam splitter. Two waveguides are brought sufficiently close together such that the light in one waveguide evanescently couples to the other waveguide. FIG. 1B illustrates a cross-section of a directional coupler 101. A first waveguide core 130 and a second waveguide core 140 are formed within cladding 120. The cladding 120 is shared for the two waveguides. The first waveguide core 130, which is 450 nm wide, is larger than the second waveguide core 140, which is 200 nm wide. The waveguides are 200 nm apart, as measured from the two sidewalls closest to the imaginary vertical plane 106, which passes through the center point between the two waveguide cores. If the two waveguides had the same width, imaginary vertical plane 106 would be a plane of symmetry for the directional coupler 101, but the different width cores breaks that symmetry. However, the directional coupler 101 still exhibits horizontal symmetry, as it is symmetric about the horizontal line of symmetry 104. Because the directional coupler 101 is horizontally symmetric, no polarization rotation occurs and this directional coupler cannot be used as a polarization rotator.

The inventors have recognized and appreciated that the horizontal symmetry of the directional coupler may be broken by forming waveguide cores that are not rectangular in shape. One or both of the waveguide cores of a directional splitter may be formed to have symmetry-breaking fins that are integrally connected with a main portion of the waveguide cores. The height of the fins is less than the height of the main portion of the waveguide core, thereby causing the horizontal symmetry to be broken. While the width of the symmetry breaking fin is not crucial to the operation of some embodiments, the width is preferably sufficient to break the symmetry, but sufficiently narrow that higher order modes are not supported by the waveguide core.

While the symmetry-breaking fin is present in the first waveguide core, the second waveguide core is adiabatically tapered to increase its width. Additionally or alternatively, in some embodiments, the first waveguide core may be adiabatically tapered to decrease its width. The presence of the fin and the tapering of the waveguide core causes light in the fundamental TM mode from the first waveguide core to couple to the fundamental TE mode of the second waveguide core via adiabatic mode evolution. Accordingly, embodiments may simultaneously be a polarization splitter and polarization rotator.

The aspects and embodiments described above, as well as additional aspects and embodiments, are described further below. These aspects and/or embodiments may be used individually, all together, or in any combination of two or more, as the application is not limited in this respect.

One embodiment is now described in connection with FIG. 2 and FIGS. 3A-3B. FIG. 2 is a top elevation view of a photonic device 200 according to some embodiments. FIG. 3A is a cross-section of the photonic device 200 taken through the plane labeled "A" in FIG. 2. FIG. 3B is a cross-section of the photonic device 200 taken through the plane labeled "B" in FIG. 2.

The photonic device 200 is a directional coupler comprising two waveguide cores 210 and 230 with four ports 212, 214, 232, 234. The photonic device is configured to receive light in the input port 212 of the first waveguide core 210. Light may be received in any way that suitably results in light propagating down the length of waveguide core 210. In some embodiments, photonic device 200 is one component of a larger photonic circuit formed on the same chip. In other embodiments, light may be coupled to the input port 212 from free space using one or more lenses. In other embodiments, light may be coupled to the input port 212 via an optical fiber placed near the input port 212 or butt-coupled to input port 212.

In some embodiments, no light is coupled into input port 232 of second waveguide core 230. The input port 232 may be blocked to prevent stray light from coupling to photonic device 200.

Light received at input port 212 may be of any polarization state. The first waveguide core 210 supports both at least one TE mode and at least one TM mode. In some embodiments, the input light may comprise a first portion of light that is in the fundamental TE mode of the first waveguide core 210 and a second portion of light that is in the fundamental TM mode of the first waveguide core 210. As described in more detail below, light that is in the fundamental TE mode of the first waveguide core 210 at the input port 212 will be output from port 214 of the first waveguide core 210. Light that is in the fundamental TM mode of the first waveguide core 210 at the input port 212 will be output from output port 234 of the second waveguide core 230. The light at output port 234 is in the fundamental TE mode of the second waveguide core 230, a polarization that is orthogonal to the original polarization of the light when it was in the first waveguide core 210.

The photonic device 200 may be designed to operate with light of any wavelength. In some embodiments, the light may be ultraviolet light, visible light, or infrared light. In some embodiments, telecommunications wavelengths may be used, such as light in the O-band (from 1260 nm to 1360 nm) and the C-band (from 1530 nm to 1565 nm).

The first waveguide core 210 includes a main portion 211 and a symmetry breaking fin 215. The main portion has a first width W1, which may be any width that suitably supports at least one TE mode and one TM mode. For example, the first width W1 may be less than 500 nm and greater than 350 nm. In further embodiments, the first width W1 may be less than or equal to 450 nm and greater than or equal to 400 nm. In yet further embodiments, the width may be approximately 450 nm, or any other value that fits within the above ranges. The first width W1 of the first waveguide core 210 stays constant throughout the region that begins at the plane labeled "A" in FIG. 2 and the plane labeled "B" in FIG. 2.

The main portion 211 of the first waveguide core 210 has a first height H1, which may be any height that suitably supports at least one TE mode and one TM mode at the operational wavelength of the photonic device 200. In some embodiments, the first height H1 may be between 150 nm and 400 nm. In other embodiments, the first height H1 may be between 200 and 300 nm. In still other embodiments, the first height H1 may be 220 nm, or any other value that fits within the above ranges.

The fin 215 of the first waveguide core 210 is integrally connected with the main portion 211 of the first waveguide core 210. The fin 215 is what breaks the horizontal symmetry of the first waveguide core 210 because the composite of the fin 215 and the main portion 211 is asymmetric about an imaginary plane that bisects the height of the main portion 211 and is parallel to the bottom surface of the first waveguide core 210 throughout a region of the photonic device that begins at the plane labeled "A" in FIG. 2 and the plane labeled "B" in FIG. 2. The fin 215 may not exist at all portions of the waveguide (e.g., near the input port 212 and the output port 214). Thus, the fin 215 may be gradually introduced to and removed from the first waveguide core 210 by tapering the fin 215. By tapering the fin 215 at its beginning and end, the mode structure of the first waveguide core 210 changes adiabatically due to the gradual introduction of the fin 215.

The fin 215 and the main portion 211 are made from the same material. The fin 215 has a width W0, which is not a critical dimension. The width W0 is preferably large enough to break the symmetry of the first waveguide core 210, but small enough that additional higher order modes are not supported by the first waveguide core 210 due to the introduction of the fin 215. In some embodiments, the width W0 is less than the width W1 of the main portion 211. In some embodiments, width W0 is less than half the width W1 of the main portion 211. For example the width W0 may be between 100 nm and 300 nm or between 150 nm and 250 nm. In some embodiments, the width W0 may be approximately 200 nm. The width W0 of the fin 215 is constant throughout the region of the photonic device that begins at the plane labeled "A" in FIG. 2 and the plane labeled "B" in FIG. 2.

The fin 215 has a height H0, which is constant throughout a region of the photonic device that begins at the plane labeled "A" in FIG. 2 and the plane labeled "B" in FIG. 2. In some embodiments, the height H0 is less than the height H1 of the main portion 211. In some embodiments, height H0 is less than half the height H1 of the main portion 211. For example the height H0 may be between 50 nm and 300 nm or between 100 nm and 200 nm. In some embodiments, the height H0 may be approximately 100 nm.

The second waveguide core 230 has a width W2 at the plane labeled "A" in FIG. 2 and a width W2' at the plane labeled "B" in FIG. 2. Thus, the width of the second waveguide core 230 increases throughout this region from the input port 232 to the output port 234. Thus, the second waveguide core 230 is tapered. The width of the second waveguide core 230 increases gradually such that the mode structure of the second waveguide core 230 evolves adiabatically. The taper of the second waveguide core 230 may increase in any suitable way. For example, the width may increase linearly, quadratically, exponentially, logarithmically, or via any other monotonically increasing function.

In some embodiments, both the width W2 and the width W2' are less than the width W1 of the main portion 211 of the first waveguide core 210. In some embodiments, only width W2 is less than the width W1, while the width W2' may be equal to or larger than the width W1. In some embodiments, the width W2 may be larger than the width W0 of the fin 215. In other embodiments, the width W2 may be smaller than the width W0 of the fin 215. In some embodiments, the width W2 may be between 150 nm and 300 nm. In some embodiments, the width W2 may be between 200 nm and 250 nm. For example, the width W2 may be approximately 250 nm.

In some embodiments, the width W2' may be larger than the width W0 of the fin 215. In some embodiments, the width W2' may be between 200 nm and 600 nm. In some embodiments, the width W2 may be between 300 nm and 500 nm. For example, the width W2 may be approximately 400 nm.

In some embodiments, the second waveguide core 230 is tapered such that the sidewall 233 proximate, or nearer, to the first waveguide core 210 remains the same distance from the first waveguide core 210 throughout the region of the photonic device that begins at the plane labeled "A" in FIG. 2 and the plane labeled "B" in FIG. 2. Thus, the taper is achieved by shifting the sidewall 231 distal to the first waveguide core 210 even farther away from the first waveguide core 210.

The second waveguide core 230 has a height H2, which may be any height that suitably supports at least one TE mode and one TM mode at the operational wavelength of the photonic device 200. In some embodiments, the height H2 is equal to the height H1 of the first waveguide core 210. In other embodiments, the height H2 may be different from the height H1. In some embodiments, the height H2 may be between 150 nm and 400 nm. In other embodiments, the height H2 may be between 200 and 200 nm. In still other embodiments, the height H2 may be 220 nm, or any other value that fits within the above ranges.

The first waveguide core 210 and the second waveguide core 230 are disposed a distance Wc apart. In some embodiments, the gap between the two waveguides is filled with a cladding 220. The distance Wc may be any distance that suitably allows evanescent coupling of the light guided by the first waveguide core 210 to the second waveguide core 230. In some embodiments, the distance Wc is less than the initial width W2 of the second waveguide core 230. In some embodiments, the distance Wc is less than or equal to the width W0 of the fin 215. In some embodiments, the distance Wc is between 100 nm and 300 nm. In other embodiments, the width Wc is between 150 nm and 250 nm. For example, the distance Wc may be approximately 200 nm, or any other value that falls within the above ranges.

As stated above, the presence of the fin 215 and the expansion of the width of the second waveguide core 230 results in adiabatic mode evolution that results in light in the TM mode of the first waveguide core 210 converting into light in the TE mode of the second waveguide core 230 as the light propagates from the plane labeled "A" in FIG. 2 and the plane labeled "B" in FIG. 2. This region, between plane "A" and plane "B" is called the "adiabatic length L. The adiabatic length L of the photonic device 200 may be any length that allows sufficient conversion and splitting. In some embodiments, the adiabatic length is between 100 microns and 500 microns. In other embodiments, the adiabatic length is between 100 and 300 microns. In other embodiments, the adiabatic length may be approximately 150 microns, or any other suitable value within the above state ranges.

In some embodiments, only the four fundamental modes are supported by the photonic device 200: the TE0 mode of the first waveguide core 210, the TM0 mode of the first waveguide core 210, TE0 mode of the second waveguide core 230, and the TM0 mode of the second waveguide core 230. The light guided within each of these modes experiences an effective index of refraction that is effected by the geometry of the photonic device 200. In particular, the effective index of refraction for each mode may change as a function of the width of the second waveguide core 230. Thus, as light travels from the input side of the photonic device 200 to the output side of the photonic device, the light in each mode will experience a changing index of refraction.

Figure 4:
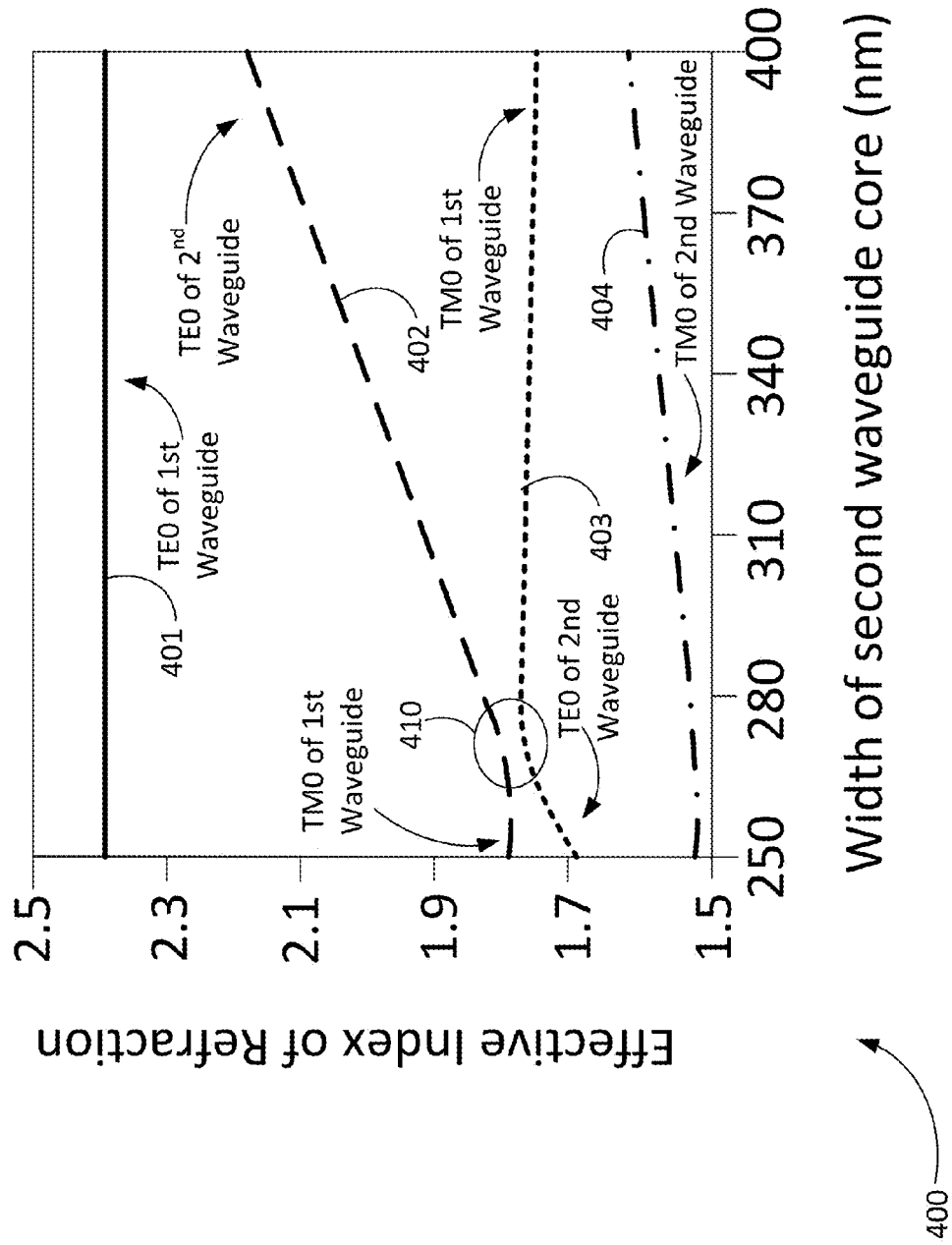
FIG. 4 illustrates the mode evolution of the four fundamental modes as light propagates through a photonic device according to some embodiments as a function of the width of the second waveguide core.

Considering the four modes of the two waveguide cores (the TE0 modes of the first and second waveguide cores and the TM0 modes of the first and second waveguide cores), the effective index of refraction experienced by light coupled to those four modes may be ordered from lowest to highest. In some embodiments, the ordering of these effective indices of refraction remains the same throughout the photonic device 200. For example, at the plane labeled "A" in FIG. 2, where the second waveguide is at its thinnest width, the effective index of refraction 401 experienced by light initially coupled to the TE0 mode of the first waveguide core 210 may be greater than the effective index of refraction 402 experienced by light initially coupled to the TE0 mode of the second waveguide core 230, which may be greater than the effective index of refraction 403 experienced by light initially coupled to the TM0 mode of the first waveguide core 210, which may be greater than the effective index of refraction 404 experienced by light initially coupled to the TM0 mode of the second waveguide core 230. The same light, initially coupled to its respective mode, experiences effective indices of refraction with the same ordering at the plane labeled "B" in FIG. 2. FIG. 4 illustrates a graph of the evolution of these four effective indices of refraction 401-404 for a photonic device 200 according to some embodiments as a function of the width W2 of the second waveguide core 230. This data is based on a first width W1 of the first waveguide core 210 equal to 450 nm, a height H1 of the first waveguide core 210 equal to 220 nm, a height H0 of the fin 215 equal to 100 nm, a width W0 of the fin 215 equal to 200 nm and a height H2 of the second waveguide core 230 equal to 220 nm. Because a degeneracy point (or crossing) has been lifted for the TE0 mode of the second waveguide and the TM0 mode of the first waveguide, the ordering of the indices of refraction from lowest to highest value remains the same throughout the photonic device 200. In other words, there is an anti-crossing 410 such that the effective index of refraction 402 and the effective index of refraction 403 do not cross. Thus, the effective index of refraction 403 of light initially coupled to the TE mode of the second waveguide does not become larger than the effective index of refraction 402 of light initially coupled to the TM mode of the first waveguide. If, for example, the effective index of refraction of the fundamental TM mode of the first waveguide core 210 crossed with the fundamental TE mode of the second waveguide core 230, no polarization rotation would occur.

The effect of the effective index of refraction 402 and the effective index of refraction 403 becoming similar in value at the anti-crossing 410 is that the individual waveguide modes become hybrid polarization modes (a combination of the TE mode from second waveguide and the TM mode from the first waveguide). Thus, rather than light staying in the TM mode of the first waveguide in which it was originally coupled, the light adiabatically evolves to be in the TE mode of the second waveguide. In this way, a polarization splitter and rotator is realized.

Figure 5:
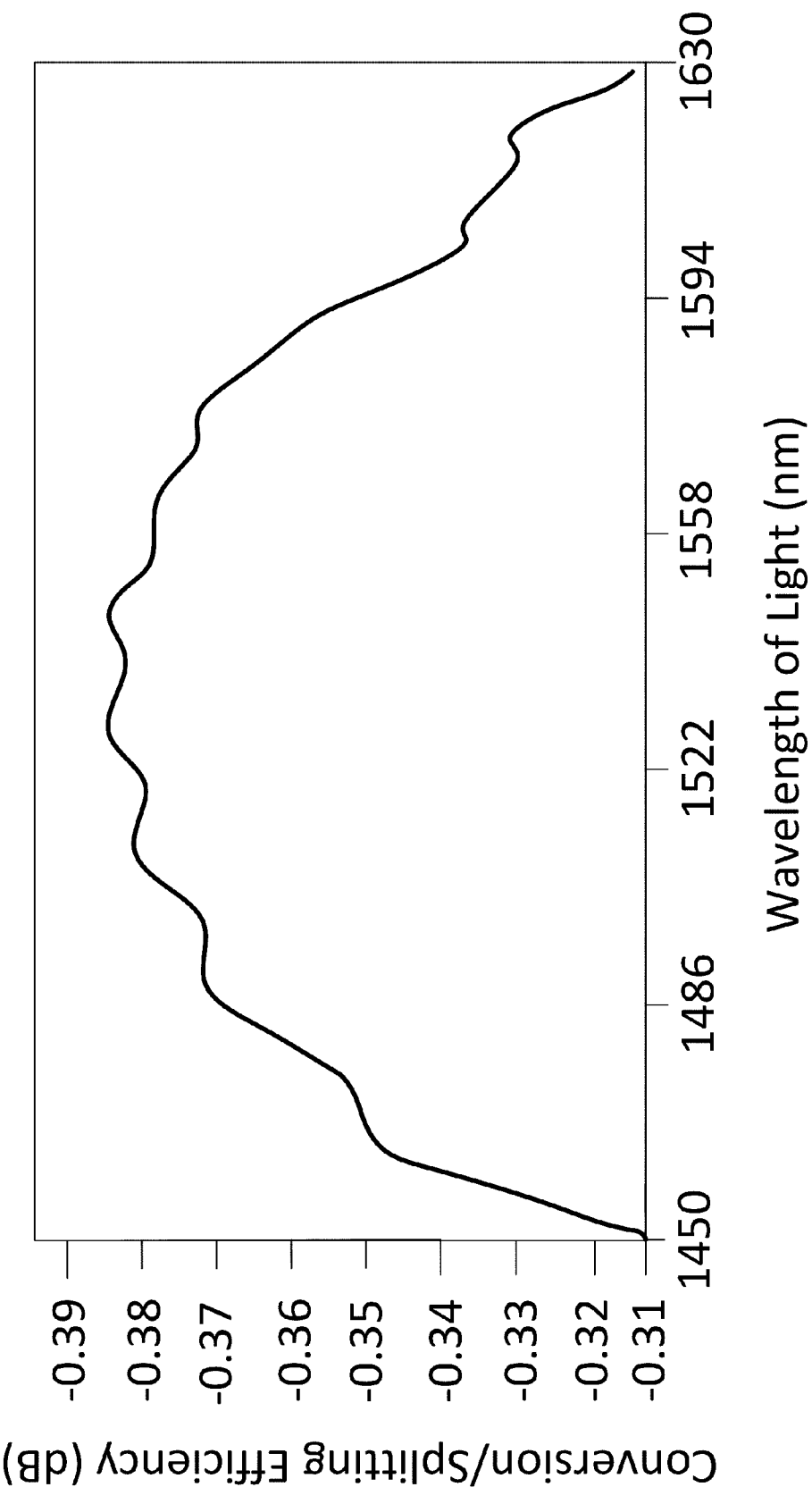
FIG. 5 is a graph of the conversion/splitting efficiency for a photonic device according to some embodiments as a function of the wavelength of operational wavelength.

FIG. 5 illustrates the conversion efficiency and splitting efficiency of the above described photonic device 200 as a function of the wavelength of the light coupled into input port 212. The conversion efficiency is the amount of light in the TM mode of the first waveguide core 210 that converts to light in the TE mode of the second waveguide core 230. The conversion efficiency is better than −0.36 dB (approximately 92%) for a wide range (about 100 nm) of wavelengths centered around 1550 nm, with a peak conversion efficiency of approximately 98%. Thus, the photonic device is an effective broadband polarization converter. The portion of the light that is not converted by the photonic device remains in the TM mode of the first waveguide core 210. This TM light may be cleanup by placing a polarization clean-up filter at the output port 214 of the first waveguide, which may resulting in a polarization extinction ratio of better than 50 dB.

Figure 6A:
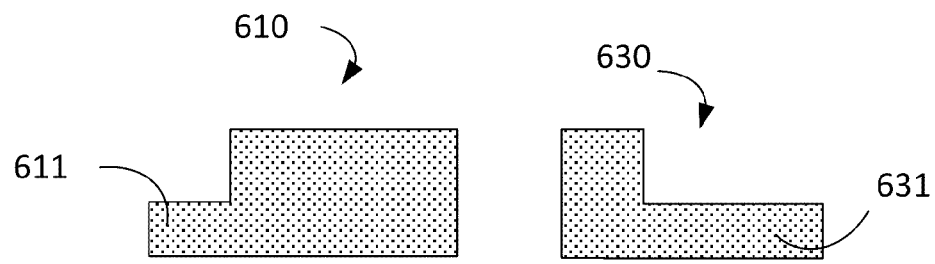
FIG. 6A is a cross-section of a photonic device according to some embodiments.
Figure 6B:
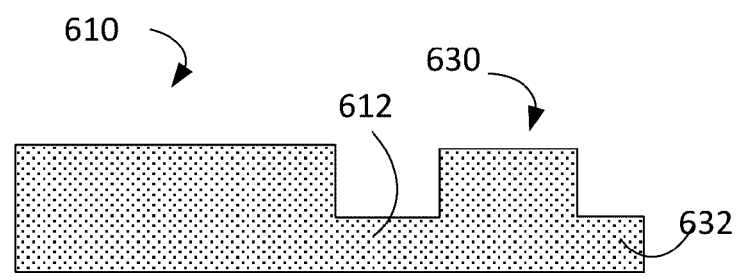
FIG. 6B is a cross-section of a photonic device according to some embodiments.
Figure 6C:
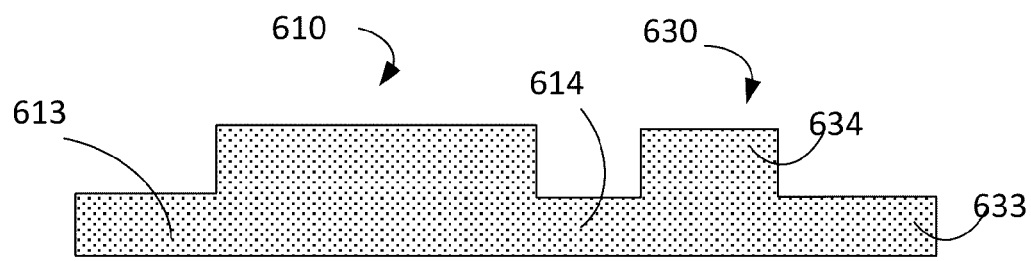
FIG. 6C is a cross-section of a photonic device according to some embodiments.
Figure 6D:
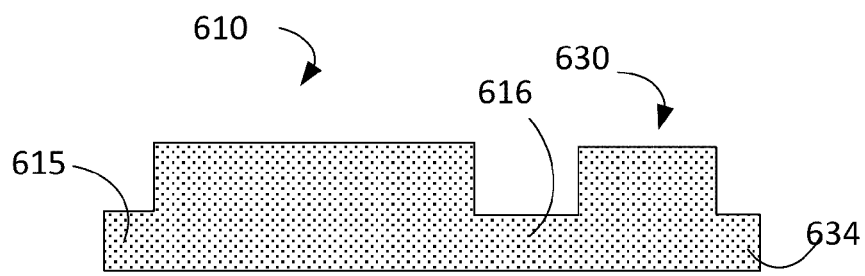
FIG. 6D is a cross-section of a photonic device according to some embodiments.

Embodiments are not limited to the geometry of the fin and main portion described above. Other asymmetric geometries of the first waveguide core may result in a photonic device that acts as a polarization rotator and/or a splitter. FIGS. 6A-6D illustrate alternative cross-sections of the photonic device that may be used in alternative embodiments. These cross-sections are similar to the cross-section illustrated in FIG. 3B, but for different geometries. FIG. 6A illustrates an embodiment where both the first waveguide core 610 includes a fin 611 distal to the second waveguide core 630 and the second waveguide core 630 includes a fin 631 distal to the first waveguide core 630. The fin 631 is wider than the fin 611, but both fins have the same height. FIG. 6B illustrates an embodiment where the first waveguide core 610 has a fin 612 that connects the first waveguide core 610 to the second waveguide core 630, and the second waveguide core 630, which is narrower of the two cores, also includes a fin 632 distal to the first waveguide core 610. FIG. 6C illustrates an embodiment similar to the embodiment in FIG. 6B, but fin 633 of the second waveguide core 630 is wider than the main portion 634 of the second waveguide core 630 and the first waveguide core 610 includes both a fin 613 distal from the second waveguide core 613 and a fin 614 that connects the first waveguide core 610 to the second waveguide core 634. FIG. 6D illustrates an embodiment similar to the embodiment in FIG. 6B, but the fin 615 is less wide that the fin 616, and the fin 634 is less wide than the fin 616.

Figure 7:
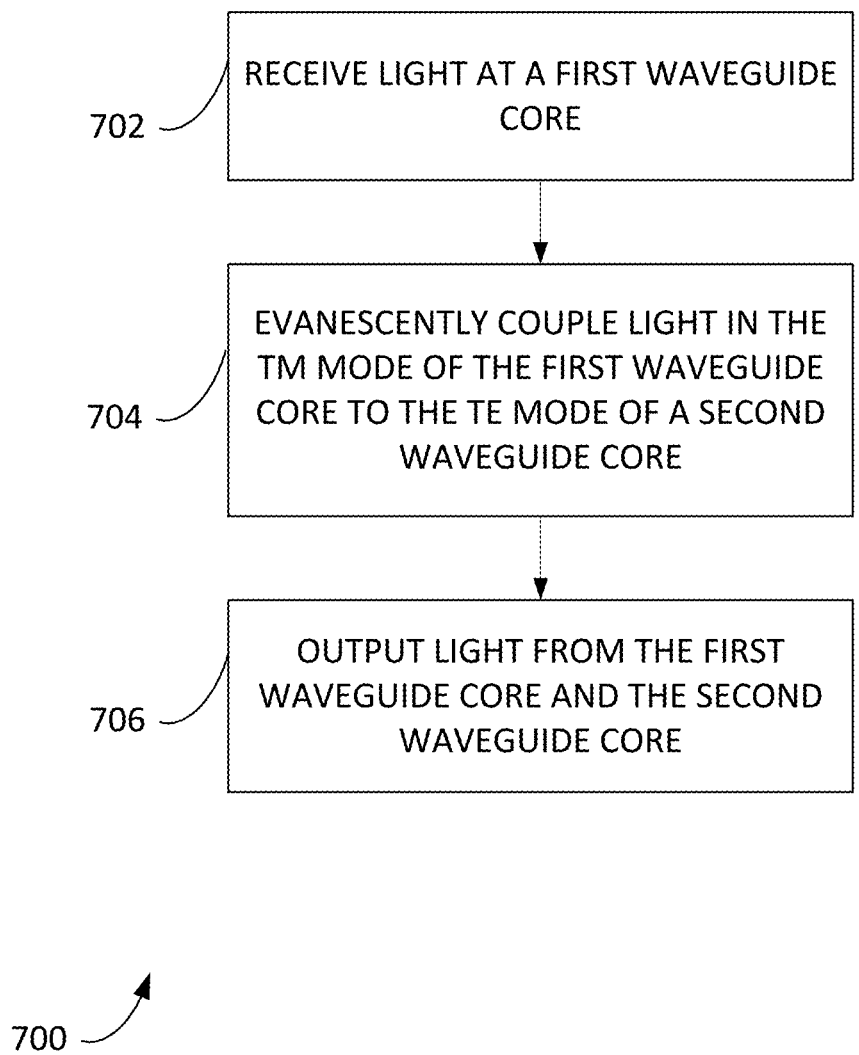
FIG. 7 is a flow chart of a method of use according to some embodiments.

FIG. 7 is a flowchart of a method 700 of use of a photonic device according to some embodiments.

At act 702, light is received at the first waveguide core. In some embodiments, the light is received at an input port of the first waveguide core, as described above. The light may couple into a TE mode and/or a TM mode of the first waveguide core. The first waveguide core may have any suitable geometry, as described above.

At act 704, light from the TM mode of the first waveguide core is evanescently coupled to the second waveguide core, as described above.

At act 706, light is output from the first waveguide core and the second waveguide core. The light may be processed further by other components on the chip, coupled to another chip, or coupled to free-space for additional manipulation and/or detection.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

What is claimed is:

1. A photonic device comprising:
a first waveguide core having a length along which light propagation is supported, the first waveguide core being asymmetric relative to a first imaginary plane that bisects a height of the first waveguide core and is parallel to a bottom surface of the first waveguide core throughout a first region of the photonic device, wherein the first waveguide core is also asymmetric relative to a second imaginary plane that is perpendicular to the first imaginary plane and bisects a width of the first waveguide core; and
a second waveguide core, wherein a side surface of the second waveguide core is parallel to the first waveguide core throughout the first region of the photonic device.

2. The photonic device of claim 1, further comprising:
a cladding disposed between the first waveguide core and the second waveguide core, wherein the cladding is made from a single material.

3. The photonic device of claim 1, wherein:
the first waveguide core comprises a main portion and a fin, wherein a height of the fin is less than a height of the main portion; and
the fin causes the first waveguide core to be asymmetric relative to the first and second imaginary planes.

4. The photonic device of claim 3, wherein:
a width of the fin is less than a width of the main portion.

5. The photonic device of claim 4, wherein:
the width of the fin is less than half the width of the main portion.

6. The photonic device of claim 3, wherein:
the height of the fin is less than half the height of the main portion.

7. The photonic device of claim 3, wherein:
the height of the main portion of the first waveguide core is equal to a height of the second waveguide core.

8. The photonic device of claim 1, wherein:
a width of the second waveguide core varies in the first region.

9. The photonic device of claim 8, wherein:
the first region comprises an input side configured to receive light from outside the first region and an output side configured to output light from the first region; and
a first width of the second waveguide core at the input side of the first region is less than a second width of the second waveguide core at the output side of the first region.

10. The photonic device of claim 9, wherein:
the first waveguide core supports a first fundamental transverse electric (TE) mode and a first fundamental transverse magnetic (TM) mode at a first wavelength;
the second waveguide core supports a second fundamental TE mode and a second fundamental TM mode at the first wavelength;
each of the first TE mode, the first TM mode, the second TE mode and the second TM mode is associated with an effective index of refraction;
an ordering of the indices of refraction experienced by light that is coupled to the first TE mode, the first TM mode, the second TE mode and the second TM mode from smallest to largest is the same at the input side of the first region and the output side of the first region.

11. The photonic device of claim 1, wherein the photonic device is configured such that an anti-crossing of effective refractive index occurs between a first polarization mode of the first waveguide core and a second polarization mode of the second waveguide core.

12. The photonic device of claim 1, wherein the photonic device is a polarization splitting directional coupler that splits input light from the first waveguide core between the first waveguide core and the second waveguide core based on whether the light is a TE mode or a TM mode.

13. The photonic device of claim 12, wherein the photonic device is a polarization rotator that rotates input light in a TM mode of the first waveguide core into a TM mode of the second waveguide core.

14. The photonic device of claim 1, wherein a width of the first waveguide core is greater than a width of the second waveguide core throughout the first region.

15. The photonic device of claim 1, wherein:
the first waveguide core is configured to guide light of a wavelength $\lambda$; and
the first waveguide core and the second waveguide core are separated by a distance that is less than $\lambda/4$.

16. A method of separating the transverse electric (TE) and transverse magnetic (TM) modes of light:
receiving light into a first waveguide core, a first portion of the light in a TE mode and a second portion of the light in a TM mode of the first waveguide core, wherein the first waveguide core has a length along which propagation of the light is supported and wherein the first waveguide core is asymmetric relative to a first imaginary plane that bisects a height of the first waveguide core and is parallel to a bottom surface of the first waveguide core throughout a first region, the first waveguide core also being asymmetric relative to a second imaginary plane that is perpendicular to the first imaginary plane and bisects a width of the first waveguide core; and
evanescently coupling, in the first region, the second portion of the light in the TM mode to a second waveguide core, wherein a side surface of the second waveguide core is parallel to the first waveguide core throughout the first region.

17. The method of claim 16, wherein:
the first waveguide core comprises a main portion and a fin, wherein a height of the fin is less than a height of the main portion; and
the fin causes the first waveguide core to be asymmetric relative to the first and second imaginary planes.

18. The method of claim 17, wherein a width of the fin is less than a width of the main portion.

19. The method of claim 16, wherein a width of the second waveguide core varies in the first region.

20. The method of claim 16, wherein a width of the first waveguide core is greater than a width of the second waveguide core throughout the first region.

* * * * *